Patented June 9, 1936

2,043,534

UNITED STATES PATENT OFFICE 2,043,534

PROCESS FOR PREPARING POTASSIUM FORMATE

Egon Elöd, Karlsruhe, and Otto Dragendorff, Oestrich, Germany, assignors to firm Rudolph Koepp & Co., Chemische Fabrik A. G., Oestrich, Germany, a corporation of Germany No Drawing. Application June 22, 1933, Serial No. 677,078. In Germany June 25, 1932

14 Claims. (Cl. 260—114)

According to a well known process alkali formates are produced by causing carbon monoxide to react at elevated pressures and elevated temperatures on mixtures of alkali sulphate and lime in an aqueous medium.

This process has long been technically carried out for the production of sodium formate. It has, however, not been found possible to produce potassium formate in an anologous manner on a manufacturing scale, since, when carrying out the known process with potassium sulphate, large losses of this expensive starting material occur.

It has been found according to this invention that during the reaction of carbon monoxide with a mixture of equivalent quantities of potassium sulphate and lime in an aqueous medium at elevated pressure and elevated temperatures, precipitates are formed beside potassium formate and calcium formate which substances contain potassium in a difficultly soluble and almost non-reactive form.

It has further been found that the aforesaid precipitates contain, depending upon the working conditions, more or less large quantities of potassium sulphate-penta calcium sulphate $$(5CaSO_4.K_2SO_4.H_2O),$$

referred to briefly hereinafter as "penta sulphate". Losses of potassium amounting up to 20% can occur in the formation of this penta sulphate. Since the penta sulphate is an extraordinarily resistant compound it was obvious that the successful solution of the problem of preparing potassium formate with the avoidance of losses of potassium lay in the direction of finding reaction conditions under which the formation of the penta sulphate is completely or extensively avoided.

This method is, however, not adopted according to the present invention; on the contrary the operation is intentionally effected so as to form penta sulphate. It is then surprisingly found that it is possible to carry out the process of the formate formation at high speeds of reaction and directly to obtain solutions containing a high percentage of potassium formate which are practically free from calcium formate.

In order to carry the invention into effect the potassium sulphate is employed in such quantities that it suffices for the formation of the potassium formate and also for the formation of the penta sulphate.

If, for example, carbon monoxide is caused to react with a mixture of potassium sulphate and lime in the proportion of, for example, $6K_2SO_4$ and $5Ca(OH)_2$ in an aqueous medium, a highly valuable potassium formate solution and penta sulphate are obtained in accordance with the following equation

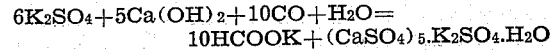

$$6K_2SO_4 + 5Ca(OH)_2 + 10CO + H_2O = \\ 10HCOOK + (CaSO_4)_5.K_2SO_4.H_2O$$

Examples 1. 209 gms. of $K_2SO_4$ and 56.2 gms. of lime in 600 ccs. of water are treated at 170° C. with carbon monoxide under a pressure of 13.6 atms. About 600 ccs. of a 28% potassium formate solution are obtained, which is practically free from calcium formate, as well as 170 gms. of a precipitate consisting of potassium sulphate-penta calcium sulphate.

In carrying out this process known difficulties had to be contended with, resulting during the manipulation, for example conveying with the aid of pumps, of the masses which are viscous to pasty at relatively very low concentrations and which are obtained in the production of mixtures of caustic lime and potassium sulphate. This extraordinarily high viscosity also has a detrimental influence on the reactivity for example the absorptive capacity of the mass for carbon monoxide.

It has now been found according to this invention that these difficulties can be overcome in a very simple manner if thinly liquid, easily manipulated and satisfactorily reactive caustic lime-potassium sulphate mixtures are employed as starting materials which are obtained by ensuring the presence of electrolytes during or after the production of these mixtures. As electrolytes there may, for example, be employed potassium chloride, sodium sulphate, calcium chloride, calcium formate, sodium formate, caustic alkalies and the like, or even potassium formate. The use of the last named offers further considerable advantages in that the potassium formate solution resulting during the course of the process is not impurified by any foreign bodies. The quantities of electrolyte necessary for the production of a sufficiently thin liquid depend upon the nature of the electrolytes and upon the concentration of the products present or to be prepared. The electrolytes may be employed or added individually or also both in solid, preferably finely divided form, and also in a dissolved form. In place of adding electrolytes, the potassium sulphate itself may also be employed as electrolyte. In this case, however, since potassium sulphate is not sufficiently soluble in water at ordinary temperature, such elevated temperatures, preferably those of at least 50° C., have to be employed that sufficient quantities of potassium sulphate enter into or remain in solution for the production of the electrolyte action.

As already mentioned, the electrolytes, if such are employed, can be added both during and also after the production of the aqueous mixtures. One method of procedure is, for example, to dilute slaked lime with the aqueous solution of one or more electrolytes or, alternatively, by slaking calcined lime with water, first to produce a stiff paste and then to stir the same in with the electrolytes added in solid form and then to add potassium sulphate to the resulting milk of lime obtained in one or other of the described ways. The operation may, however, also be effected by slaking calcined lime with water and stirring in potassium sulphate, for example in the form of a fine powder, into the resulting paste, which can, if necessary, be further diluted. If one or more solid electrolytes or a suitably concentrated solution of an electrolyte is added to this mass which has set to a more or less stiff paste, thinly liquid easily manipulated and satisfactorily reactive products are obtained in this way even with very high concentrations in a short time, the more rapidly the greater the quantity of electrolyte added. If necessary these various combinations may also be combined together, for example in such a way that depending upon the concentration desired for the end products, potassium sulphate itself is employed and also additional salts of the aforementioned kind as electrolytes.

2. 14 kgms. of calcined lime are slaked with 70 litres of water, a solution of 30 kgms. of calcium formate in 180 litres of water added thereto and 45 kgms. of potassium sulphate in a ground condition slowly stirred in. The mixture remains completely thinly liquid.

3. 14 kgms. of calcined lime are slaked with 70 litres of water, diluted with a further 180 litres of water and 45 kgms. of finely ground potassium sulphate stirred into the resulting milk of lime, whereby the whole mass sets to a stiff paste. If 30 kgms. of potassium formate are added to this paste, either in solid form or as a concentrated solution, the mass becomes thinly liquid in a short time.

4. 14 kgms. of calcined lime are slaked and brought with water to a volume of 250 litres. The milk of lime is then heated to 80° C. and 45 kgms. of potassium sulphate ground into the same, care being taken to ensure that during this operation the temperature of the mixture does not fall below 80° C. In this case also a thinly liquid easily conveyable mass is obtained.

The penta sulphate formed as by-product during the reaction of carbon monoxide on the thinly liquid mixture of lime and potassium sulphate according to Example 1, can be further worked up and utilized. In this way it is possible to compensate for the loss of potash, which must be temporarily incurred in order to obtain the aforementioned advantages (acceleration of the reaction and direct production of a practically lime-free potassium formate solution).

With a view to utilizing the penta sulphate, the precipitate, after separation from the potassium formate solution, may be stirred with water, for example at slightly elevated temperatures. Decomposition takes place according to the following equation:

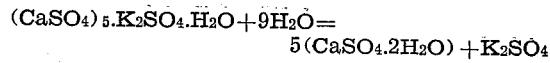

$$(CaSO_4)_5 \cdot K_2SO_4 \cdot H_2O + 9H_2O = 5(CaSO_4 \cdot 2H_2O) + K_2SO_4$$

The potassium sulphate solution separated from the precipitated gypsum can then be employed in a fresh batch for the production of potassium formate.

An alternative procedure is, for example, to stir the penta sulphate with potassium sulphate in an aqueous medium at low temperatures and, by adding excess of calcium formate, to bring about a conversion with the formation of potassium formate and gypsum.

The penta sulphate may also be directly worked up to potassium formate and gypsum with the aid of excess of calcium formate in accordance with the equation

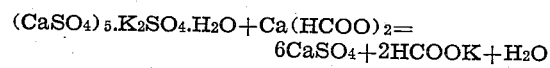

$$(CaSO_4)_5 \cdot K_2SO_4 \cdot H_2O + Ca(HCOO)_2 = 6CaSO_4 + 2HCOOK + H_2O$$

An advantageous procedure is to subject the penta sulphate, in the presence of potassium sulphate and lime, to the action of carbon monoxide at elevated temperature and elevated pressure with stirring. Reaction mixtures are thereby obtained which contain practically only calcium sulphate in addition to potassium formate and calcium sulphate.

5. The precipitate obtained according to Example 1, after the addition of 44.4 gms. of $K_2SO_4$ and 35 gms. of lime, is again treated in a separate process with 600 ccs. of water at 170° C. A solution of 12.5% of potassium formate and about 4% of calcium formate is obtained thereby, which, after separating the precipitate can, for example, be again employed in place of water in the preparation of a mixture of potassium sulphate and caustic lime according to Example 1, whereby of course the calcium formate present must be taken into consideration when determining the quantity of caustic lime to be added. In this way the solutions become enriched with potassium formate up to about 40%. The precipitate separated from the reaction solution contains only immaterial quantities of potassium sulphate.

According to this invention it has been further found that the preparation of potassium formate with the formation of penta calcium sulphate-potassium sulphate and the decomposition of the penta sulphate can be carried out in one stage provided the presence of such quantities of soluble calcium salts is ensured, for example by adding calcium formate, that any penta sulphate formed reacts in such a manner that precipitates are formed, which are practically, or to a considerable extent, free from potassium sulphate. The potassium formate solution obtained in this manner will, however, contain calcium formate as impurity.

The calcium ions necessary for the aforesaid purpose can be introduced by adding suitable quantities of calcium formate.

Other soluble calcium salts, such as calcium chloride, may, however, also be used for this purpose. One method of carrying the invention into effect is, for example, to allow the potassium formate formation to take place in a solution of calcium formate.

The following two comparative examples serve to illustrate the advantages of the invention:

6. (a) 36 gms. of $K_2SO_4$ and 14 gms. of lime in 300 gms. of water are treated in a stirring autoclave with carbon monoxide at 170° C. and a total pressure of 13.6 atms. On completion of the carbon monoxide absorption the precipitate separated from the solution, contains about 17% of the potassium sulphate employed, in a form incapable of extraction with water.

(b) 36 gms. of $K_2SO_4$, 14 gms. of lime and 15 gms. of calcium formate in 300 gms. of water are treated in a stirring autoclave with carbon monoxide at 170° C. and a total pressure of 13.6 atms. When the reaction mixture is saturated with carbon monoxide, the precipitate separated from the solution, is practically free from potassium sulphate.

In some cases it has been found that, after completion of the carbon monoxide absorption, the formation of precipitates, containing potassium sulphate, cannot be avoided to the desired extent, notwithstanding the presence of excess of calcium formate. This is probably due to the fact that the reactions taking place side by side in the reaction mixture, such as the causticization, the formation of potassium formate from carbon monoxide and caustic potash, the formation of penta sulphate from calcium sulphate and potassium sulphate, the formation of potassium formate from potassium sulphate and calcium formate, the formation of calcium formate from lime and carbon monoxide as well as the decomposition of the primarily formed penta sulphate, proceed at different speeds. It is, however, possible in these cases also practically completely to utilize the potassium sulphate for the formate formation by maintaining the reaction mixture, after the absorption of the carbon monoxide is completed, in movement for some time longer, preferably by effecting stirring in the carbon monoxide absorption vessel itself.

7. 108 gms. of $K_2SO_4$, 43.4 gms. of lime and 60 gms. of calcium formate in 600 ccs. of water are treated for 75 minutes at 170° C. with carbon monoxide under stirring. When the carbon monoxide absorption is completed, the precipitate separated from the solution still contains about 8.6% of the $K_2SO_4$ employed in a form incapable of extraction with water. If, however, stirring is continued in the autoclave at 170° C. for about 20 minutes longer practically the whole of the $K_2SO_4$ employed is rendered available in soluble form with the formation of potassium formate.

According to this invention it has been further found that in cases where, notwithstanding the presence of quantities of calcium formate sufficient in themselves, precipitates are obtained which still contain undesirably large quantities of potassium sulphate, in order to avoid losses of potassium sulphate, an alternative procedure is to treat the mixture of precipitates separated from the reaction solution for some time with water under stirring.

The calcium formate-containing potassium formate solutions obtained according to the process of this invention can be worked up to pure potassium formate by evaporating or by treating with potash or potassium oxalate or by combining both procedures.

What we claim is:—

1. A process for the preparation of potassium formate, which comprises reacting carbon monoxide with thinly liquid aqueous mixtures of caustic lime and potassium sulphate containing other electrolytes.

2. In a process according to claim 1, introducing as electrolytes caustic alkalies.

3. A process for preparing potassium formate, which comprises reacting carbon monoxide at super-atmospheric pressure and formate producing temperatures in an aqueous medium with lime and potassium sulphate, which is present in such a proportion that a solution containing substantially only potassium formate and penta calcium sulphate-potassium sulphate having the formula $(CaSO_4)_5.K_2SO_4.H_2O$ is obtained separating the penta calcium sulphate-potassium sulphate from the potassium formate solution and converting it into potassium formate.

4. In a process according to claim 3, separating the penta calcium sulphate-potassium sulphate from the potassium formate solution, converting the said penta calcium sulphate-potassium sulphate in the presence of potassium sulphate and lime in an aqueous medium by the action of carbon monoxide at formate producing temperatures and super-atmospheric pressure into potassium formate, calcium formate and calcium sulphate.

5. In a process according to claim 3, separating the penta calcium sulphate-potassium sulphate from the potassium formate solution, converting the said penta calcium sulphate-potassium sulphate with calcium formate into potassium formate and calcium sulphate.

6. In a process according to claim 3, separating the penta calcium sulphate-potassium sulphate from the potassium formate solution, stirring the said penta calcium sulphate-potassium sulphate in an aqueous medium with potassium sulphate at formate producing temperatures and converting it by the addition of excess of calcium formate into potassium formate and gypsum.

7. In a process according to claim 3, separating the penta calcium sulphate-potassium sulphate from the potassium formate solution, stirring the said penta calcium sulphate-potassium sulphate with water at formate producing temperatures, whereby gypsum and potassium sulphate are formed.

8. In a process according to claim 1 in which electrolytes are introduced as additional salts.

9. In a process according to claim 1 in which electrolytes are introduced as additional salts selected from the group consisting of potassium chloride, calcium chloride, sodium sulphate and alkali formate.

10. A process for preparing potassium formate which comprises reacting carbon monoxide with lime and potassium sulphate in an aqueous medium at super-atmospheric pressure and formate producing temperatures, said lime and potassium sulphate being present in the proportion of 6 molecules of potassium sulphate to 5 molecules of lime, whereby a solution containing substantially only potassium formate and penta calcium sulphate—potassium sulphate having the formula $(CaSO_4)_5.K_2SO_4.H_2O$ is obtained.

11. In a process according to claim 10, effecting the reaction at temperatures of at least 50° C.

12. In a process according to claim 10, introducing such quantities of soluble calcium salts that the penta calcium sulphate-potassium sulphate formed is converted in such a manner that precipitates practically free from potassium sulphate are obtained.

13. In a process according to claim 10, introducing such quantities of calcium formate that the penta calcium sulphate-potassium sulphate formed is converted in such a manner that precipitates practically free from potassium sulphate are obtained.

14. In a process according to claim 10 in which such quantities of calcium formate are introduced that the penta calcium sulphate-potassium sulphate formed is converted in such a manner that precipitates practically free from potassium sulphate are obtained and then the reaction mixture is stirred in the reaction vessel after saturation with carbon monoxide.

EGON ELÖD.
OTTO DRAGENDORFF.